(12) United States Patent
Joseph

(10) Patent No.: US 8,700,255 B2
(45) Date of Patent: Apr. 15, 2014

(54) DEVICES, SYSTEMS, AND METHODS FOR MONITORING DRIVER AND VEHICLE BEHAVIOR

(75) Inventor: Thomas C. Joseph, Fremont, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 639 days.

(21) Appl. No.: 12/575,202

(22) Filed: Oct. 7, 2009

(65) Prior Publication Data

US 2010/0087984 A1    Apr. 8, 2010

Related U.S. Application Data

(60) Provisional application No. 61/103,653, filed on Oct. 8, 2008.

(51) Int. Cl.
*G06F 7/00* (2006.01)
*G01S 19/13* (2010.01)
*G09B 19/16* (2006.01)

(52) U.S. Cl.
USPC ............ 701/34.4; 701/33.2; 342/147; 434/66

(58) Field of Classification Search
USPC .......................... 701/33, 34.4, 33.2; 235/376; 342/357.09, 147; 434/66
See application file for complete search history.

(56) References Cited

U.S. PATENT DOCUMENTS

| 5,481,906 | A  | * | 1/1996 | Nagayoshi et al. | ......... | 73/114.61 |
| 5,526,341 | A  | * | 6/1996 | Shiba et al. | ................. | 369/275.1 |
| 6,225,898 | B1 | * | 5/2001 | Kamiya et al. | ................ | 340/505 |
| 6,263,268 | B1 | * | 7/2001 | Nathanson | .................... | 701/31.5 |
| 6,363,326 | B1 | * | 3/2002 | Scully | ........................... | 701/301 |
| 6,429,789 | B1 | * | 8/2002 | Kiridena et al. | .............. | 340/905 |
| 6,470,273 | B2 | * | 10/2002 | Halsted et al. | ................ | 701/301 |
| 6,611,740 | B2 | * | 8/2003 | Lowrey et al. | .............. | 701/29.4 |
| 6,732,031 | B1 | * | 5/2004 | Lowrey et al. | .............. | 701/31.4 |
| 6,738,696 | B2 | * | 5/2004 | Oi | ................................. | 701/29.6 |
| 6,915,216 | B2 | * | 7/2005 | Troxler et al. | .................. | 702/33 |
| 7,209,221 | B2 | * | 4/2007 | Breed et al. | ................. | 356/5.02 |
| 7,272,493 | B1 | * | 9/2007 | Hamrick et al. | .............. | 701/517 |
| 7,340,332 | B2 | * | 3/2008 | Underdahl et al. | ......... | 701/29.3 |
| 7,447,577 | B2 | * | 11/2008 | Hattori et al. | ................... | 701/41 |
| 7,725,216 | B2 | * | 5/2010 | Kim | ................................... | 701/1 |
| 2005/0021294 | A1 | * | 1/2005 | Trsar et al. | ..................... | 702/183 |
| 2005/0151640 | A1 | * | 7/2005 | Hastings | ................. | 340/539.11 |
| 2006/0282886 | A1 | * | 12/2006 | Gaug | ................................ | 726/5 |
| 2007/0244631 | A1 | * | 10/2007 | Jung et al. | ..................... | 701/201 |
| 2009/0006476 | A1 | * | 1/2009 | Andreasen et al. | ........ | 707/104.1 |

* cited by examiner

*Primary Examiner* — Tuan C. To
(74) *Attorney, Agent, or Firm* — Kilpatrick Townsend & Stockton LLP

(57) ABSTRACT

Systems, devices, and techniques for remotely tracking vehicle and driver behavior. Embodiments may include an on-board vehicle monitoring device, comprising an interface device and a gateway device. The interface device may include receiving information from a diagnostic system of a vehicle. The gateway device may collect a set of vehicle operating data corresponding to a driver or vehicle behavior. The set of vehicle operating data may comprise at least some of the information from the diagnostic system of the vehicle. A host computer may have instructions for compiling driver behavior data, based at least in part on analysis of received vehicle operating data. The instructions may also include instructions for providing a user interface; and instructions for causing the user interface to display, for a user, information corresponding to the compiled driver behavior data.

27 Claims, 11 Drawing Sheets

| Date/Time First Reported | Date/Time Last Reported | Status | Ecu Description | FMI Description | Count | Freeze Frame |
|---|---|---|---|---|---|---|
| 9/22/2009 | 5/15/2009 | Active | Engine #1 | Current Above Normal | 45 | Yes |
| 7/15/2009 | 7/15/2009 | Active | Body Controller | Unknown | 2 | Yes |
| 6/13/2009 | 6/22/2009 | Active | Body Controller | Turbocharger | 27 | Yes |
| 4/27/2009 | 4/30/2009 | Active | Engine #1 | Diag. Code. #1 | 34 | Yes |
| 1/1/2009 | 5/3/2009 | Active | Engine #1 | Current Above Normal | 2 | Yes |
| 4/4/2008 | 4/5/2008 | Active | Engine #1 | Special Instr. | 1 | Yes |
| 4/1/2008 | 4/5/2008 | Active | Body Controller | Current Above Normal | 89 | Yes |

FIG. 5

| Driver | Odometer | Date | Time | Location | Status |
|---|---|---|---|---|---|
| Mary Hogan | 127,001 | 6/13/2009 | 5:27:00 PM | 1924 Meade St., Denver, Colorado | Parked |
| Peter Joseph | 55,213 | 6/13/2009 | 5:29:23 PM | 55 Westview Rd., Lowell, Massachusetts | Parked |

FIG. 6

| Date/Time First Reported | Date/Time Last Reported | Status | Ecu Description | FMI Description | Count | Freeze Frame |
|---|---|---|---|---|---|---|
| 9/22/2009 | 5/15/2009 | Active | Engine #1 | Current Above Normal | 45 | Yes |
| 7/15/2009 | 7/15/2009 | Active | Body Controller | Unknown | 2 | Yes |
| 6/13/2009 | 6/22/2009 | Active | Body Controller | Turbocharger | 27 | Yes |
| 4/27/2009 | 4/30/2009 | Active | Engine #1 | Diag. Code. #1 | 34 | Yes |
| 1/1/2009 | 5/3/2009 | Active | Engine #1 | Current Above Normal | 2 | Yes |
| 4/4/2008 | 4/5/2008 | Active | Engine #1 | Special Instr. | 1 | Yes |
| 4/1/2008 | 4/5/2008 | Active | Body Controller | Current Above Normal | 89 | Yes |

DEVICES, SYSTEMS, AND METHODS FOR MONITORING DRIVER AND VEHICLE BEHAVIOR

CROSS-REFERENCES TO RELATED APPLICATIONS

This application is a non-provisional of and claims the benefit of Provisional U.S. Patent Application No. 61/103,653, entitled "Monitoring Driver Behavior" filed on Oct. 8, 2008, the entire disclosure of which is herein incorporated by reference.

FIELD

The present disclosure relates, in general, to devices, systems, and methods for monitoring vehicle and driver behavior. More particularly, the present disclosure relates to devices, systems, and methods for transmitting and compiling various driver behavior, vehicle behavior, and diagnostic data.

BACKGROUND OF THE INVENTION

In many businesses, fleets of vehicles are maintained to make deliveries, provide transportation, pickup supplies and/or customers, and perform countless other activities. Businesses and/or organizations may maintain fleets of vehicles, ranging from one to thousands, to accomplish these tasks. Monitoring the whereabouts and use of all of these vehicles often presents problems: a driver may misuse a vehicle (such as for personal errands), a driver may take the vehicle at unauthorized times, a driver may take meandering routes (by mistake or on purpose in order to delay or avoid reaching the destination), and/or a driver may make an unauthorized stop for recreation and/or sleep.

Beyond these improper uses, drivers, while performing business-related or personal-related operation of the vehicle, may exhibit widely varying driving styles. Some drivers may tend toward cautious driving, such as maintaining a safe distance between their vehicles and the vehicles in front, braking gently, and not accelerating overly quickly. Conversely, some drivers may tend toward more dangerous driving behavior, such as: sudden stops, cutting into traffic, sudden acceleration, exceeding the speed limit, and tailgating. Further, such driving is expensive in terms of wear on the vehicle and excessive fuel use. For example, if a driver tends to accelerate quickly, fuel efficiency may decrease. As another example, if a driver applies the brakes too often, or for too long of a period of time, the brake pads, drums, and/or discs may wear out prematurely. Such driving behavior may also increase the likelihood of an accident, especially accidents that are primarily the fault of the driver. Such accidents are dangerous, are time-consuming, may result in destroyed goods or injured customers, and are expensive to resolve.

Fleet operators have a preference for safe drivers for many reasons, each which have reduced cost as an end result: less litigation relating to vehicular accidents, reduced fuel use, reduced vehicle maintenance, reduced driver downtime, longer vehicle life, to name only a few examples. Therefore, it would be advantageous for fleet operators to be able to encourage positive driving characteristics and behaviors in their drivers.

A possible way of encouraging positive driving characteristics and behaviors in drivers is through increased driver monitoring, possibly with incentives provided to drivers for efficient and safe driving (or punishment for inefficient and dangerous driving). Accordingly, there is a need in the art for tools and techniques that allow for increased monitoring and metrics to be gathered on driver and vehicle operation.

BRIEF SUMMARY OF THE INVENTION

A set of embodiments provides solutions (including without limitation, devices, systems, methods, software programs, and the like) for monitoring vehicle and driver behavior. Such solutions may include an on-board vehicle monitoring device ("OBVMD") located on a vehicle capable of collecting vehicle and driver data from the vehicle's diagnostic system. The OBVMD may also collect vehicle and driver data from subsystems, such as a global navigation satellite system receiver, a proximity sensor, and/or accelerometer. Some or all of the collected vehicle and driver data may be transmitted, via a wireless network, to a host computer system. The host computer system may receive vehicle and driver data from a plurality of vehicles. The driver and vehicle data may be compiled to create statistics for the vehicles and/or the vehicle driver's. The statistics may be compared to benchmarks, or other data about other drivers, and/or other vehicles. Further, via the host computer system, a user may be able to request vehicle and driver data from one or more vehicles. Also, when an exception event occurs, such as excessive speeding, a "hard brake" event, or a vehicle diagnostic fault, a rolling freeze frame ("RFF") of data, spanning a period of time before, during, and after the exception event may be transmitted from an OBVMD to the host computer system, thereby possibly providing data sufficient to determine the cause of the exception event.

In some embodiments, a system for remotely tracking vehicle and driver behavior is described. The system may include an on-board vehicle monitoring device, comprising an interface device and a gateway device. The interface device may receive information from a diagnostic system of a vehicle. The gateway device may compile a set of vehicle operating data corresponding to a driver or vehicle behavior. The set of vehicle operating data may comprise at least some of the information from the diagnostic system of the vehicle. The interface device may also transmit at least a portion of the set of vehicle operating data to a host-computer system via a wireless network. The system may also include the host-computer system, comprising a processor and a computer-readable storage medium. The computer-readable storage medium may have encoded thereon a set of instructions to control operation of the host computer system. The set of instructions may comprise instructions for receiving the at least a portion of the set of vehicle operating data. The set of instructions may also comprise instructions for analyzing the received vehicle operating data. Also, the set of instructions may include instructions for compiling driver behavior data, based at least in part on analysis of the received vehicle operating data; instructions for providing a user interface; and instructions for causing the user interface to display, for a user, information corresponding to the compiled driver behavior data.

In some embodiments, a method for tracking vehicle and driver behavior is described. The method may include providing an on-board vehicle monitoring device, a host computer system, and a user interface. The host computer system may comprise a computer-readable storage medium and a processor. The user interface may be stored at the host computer system on the computer-readable storage medium. The method may include receiving a trigger condition. The method may also include transmitting from the on-board vehicle monitoring system to the host computer system, a set of vehicle operating data. The method may further include receiving, at the host computer system, the set of vehicle operating data. The method may include compiling the receiving vehicle operating data. Also, the method may include determining a driver behavior, based at least in part on analysis of the compiled vehicle operating data. The method may further include storing the compiled vehicle operating data; and providing a user interface. Finally, the method may include displaying information corresponding to the compiled vehicle operating data.

In still other embodiments, an apparatus may be described that includes a computer-readable storage medium having encoded thereon a computer-readable program comprising a set of instructions for directing operation of a computer system. The set of instructions may comprise instructions for receiving a first set of vehicle operating data from a first on-board vehicle monitoring device. The set of instructions may also comprise instructions for receiving other sets of vehicle operating data from other on-board vehicle monitoring devices. The set of instructions may also include instructions for analyzing the received vehicle operating data. The set of instructions may include instructions for compiling statistics on a driver's behavior, based at least in part on analysis of the received vehicle operating data from the first and second on-board vehicle monitoring device. The instruction set may also include instructions for providing a user interface. Finally, the method may also include instructions for causing the user interface to display, for a user, information corresponding to the compiled statistics on the driver's behavior.

BRIEF DESCRIPTION OF THE DRAWINGS

A further understanding of the nature and advantages of particular embodiments may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

FIG. 5 illustrates an embodiment of a window from a user interface displaying a summary of driver information.

FIG. 6 illustrates an embodiment of a window from a user interface displaying a diagnostic report.

DETAILED DESCRIPTION OF THE INVENTION

Figure 1:
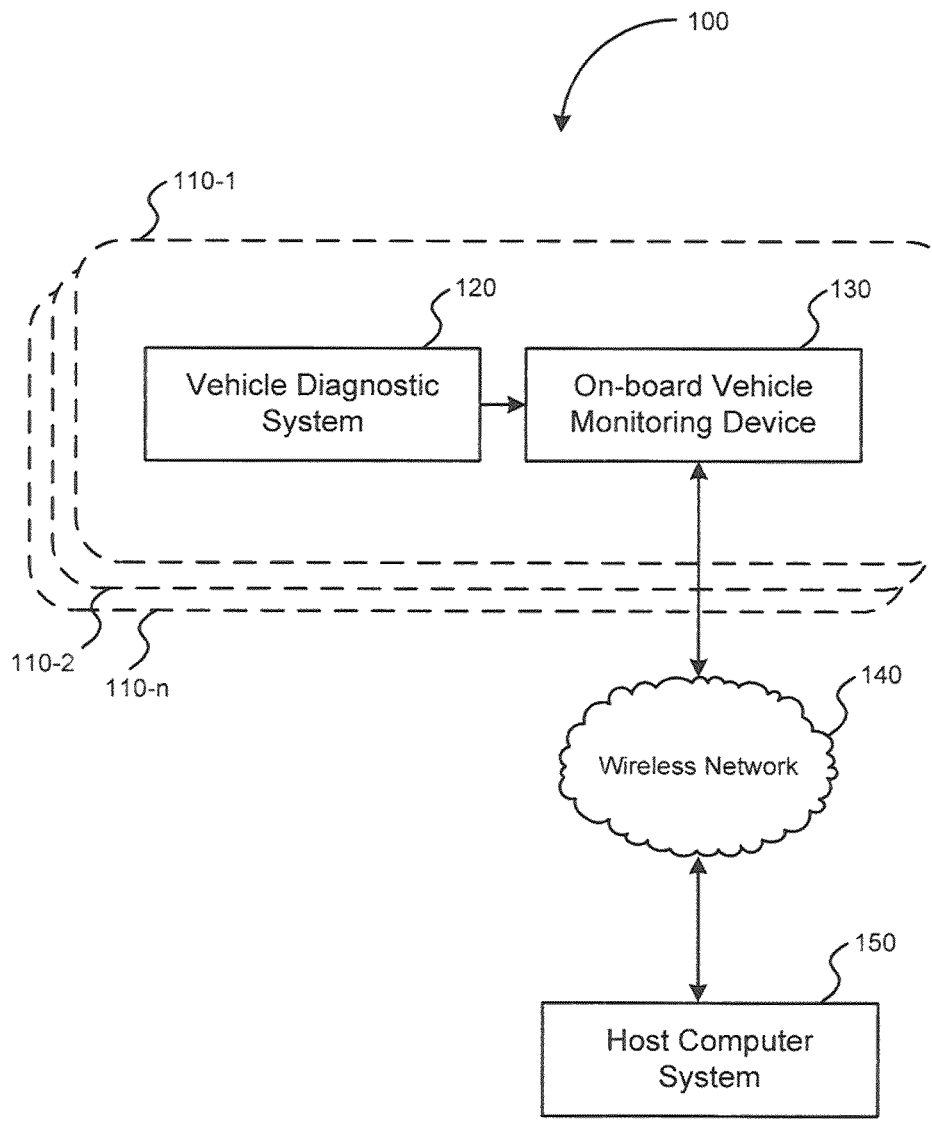
FIG. 1 illustrates a simplified block diagram of an embodiment of a system for transmitting information between an on-board vehicle monitoring device and a host computer system.

While various aspects and features of certain embodiments have been summarized above, the following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent, however, to one skilled in the art that other embodiments of the present invention may be practiced without some of these specific details. In other instances, well-known structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

A set of embodiments provide solutions (including without limitation, devices, systems, methods, software programs, and the like) for monitoring vehicle and driver behavior. In particular, some embodiments allow for an on-board vehicle monitoring device ("OBVMD") to gather information on vehicle diagnostics, location, and/or acceleration/deceleration and wirelessly transmit some or all of the data to a central host computer system ("host"). Information received at the host may be stored and compiled to create metrics for one or many drivers and/or vehicles. Some embodiments employ a gateway device as part of the OBVMD to receive information from a vehicle's diagnostic system and an interface, also part of the OBVMD, to communicate with the host via a wireless network, such as a cellular network. Some embodiments may also employ a global navigation satellite system ("GNSS") receiver, such as a global positioning system ("GPS") receiver, to determine the vehicle's location, speed, and/or direction. In some embodiments, the GNSS receiver may also be used (based on repeated location data being gathered) to determine acceleration/deceleration and/or braking. In some embodiments, an accelerometer is used to determine acceleration and braking Some embodiments also employ a proximity sensor. Such a proximity sensor may be used to determine how close the vehicle is to another vehicle (or another object) in front of the vehicle. Such information may be useful in determining whether a driver is following the preceding vehicle in traffic too closely.

In some embodiments, data, such as vehicle diagnostic information, and/or GNSS location information is transmitted via a wireless network to a host. The information may be stored and compiled at the host. For example, data may be compiled for particular trips taken with the vehicle (for example, measured as the time between when a driver turns on the ignition and turns off the ignition). Alternatively, data may be compiled for a particular driver for a period of time (such as monthly) to allow the driver to be compared to other drivers and/or benchmarks. Similarly, as opposed to compiling data for a particular driver, data may be compiled for a particular vehicle.

In some embodiments, the vehicle diagnostic information, location information, and/or other data are transmitted from the OBVMD via a wireless network to the host at regular, or near regular intervals. In some embodiments, when a fault is detected in the vehicle's on-board diagnostic system, data relating to the fault, and/or current vehicle information (such as speed, location, engine temperature, etc) is transmitted to the host system. In some embodiments, the host may be able to wirelessly request information from the OBVMD. For example, the host may request a "snapshot" of the current diagnostic information of the vehicle. In some embodiments, the host may request information for a period of time prior to, including, and/or following an event (such as a request), referred to as a rolling freeze frame ("RFF"). A RFF may include data such as location, speed, fuel use, diagnostic information, acceleration, and/or deceleration, or any other information collected by the OBVMD. Further, the transmission of an RFF may be triggered by a vehicle event, such as a "hard brake." A hard brake event may mean that the vehicle has stopped suddenly, such as by the driver applying the brakes at full or near full force, or the vehicle has crashed. Such an event may result in the OBVMD registering the event by sensing the deceleration with the GNSS receiver, the accelerometer, and/or a message received at the gateway device from the vehicle's on-board vehicle diagnostic system. What constitutes a "hard brake" event may be configured by a user via the user interface (such as, a decrease in speed greater than 15 miles per hour per second). The RFF may then be stored and/or transmitted to the host.

To illustrate some of these concepts, FIG. 1 illustrates a simplified embodiment of a system 100 for transmitting information between an OBVMD and a host. In some embodiments, the system 100 includes an OBVMD 130, a wireless network 140, and a host computer system 150. The system 100 may further include the ability to interact with a vehicle's on-board diagnostic system 120, with the OBVMD 130 and the on-board diagnostic system 120 residing on the vehicle 110-1.

The on-board diagnostic system 120 may be installed as standard or optional equipment by the vehicle manufacturer. One common version of on-board diagnostic systems is "On-Board Diagnostics," commonly referred to by the acronym "OBD." OBD exists in several forms, including OBD-I, OBD-1.5, OBD-II, and EOBD (European On-Board Diagnostics). Each form of OBD allows access to diagnostic information for various subsystems of a vehicle. Merely by way of example, OBD systems may collect and/or store information including data in such categories as: throttle position, engine revolutions per minute ("RPM"), short and long term fuel percent trim, engine coolant temperature, intake air temperature, oxygen sensor voltage, fuel type, fuel pressure, and vehicle speed. Besides OBD, other types of on-board vehicle diagnostic systems may be used to gather vehicle information. For example, J1708 or J1939 may be used. The OBVMD 130 may have the ability to receive data from these and other types of vehicle diagnostic systems. Whatever type of vehicle diagnostic system 120, both the vehicle system 120 and the OBVMD 130 may reside on the vehicle 110-1. This may involve the OBVMD 130 being mounting at or near the hardware associated with the on-board diagnostic system. Alternatively, the OBVMD 130 may be mounted in a separate location on the vehicle, with the OBVMD 130 being communicatively connected to the on-board diagnostic system 120.

The OBVMD 130 may communicate with the host computer system 150 via a wireless network 140. In some embodiments, the wireless network 140 may be a digital or analog cellular network. The use of such a wireless network 140 may provide near universal wireless coverage, especially in urban areas. In other embodiments, the wireless network may employ satellite communication. The host computer system 150 may be located in a central location, or may be distributed.

In addition to vehicle 110-1, vehicle 110-2 may be present. Vehicle 110-2 may have a similar on-board diagnostic system and OBVMD as on vehicle 110-1. For simplicity, the specifics associated with vehicle 110-2 are not illustrated. The OBVMD of vehicle 110-2 may communicate with host computer system 150 using the same wireless network 140 as vehicle 110-1 or may use some other wireless network. For example, if vehicle 110-1 and 110-2 are in different locations, different wireless networks may be used. Further, in addition to vehicles 110-1 and 110-2, any number of other vehicles (represented as 110-n) may employ a similar OBVMD to that of vehicle 110-1 and transmit data to and from the host computer system 150. Such other vehicles may be distributed in a region, a country, or throughout the world.

In some embodiments, a wired connection (not pictured) either in addition to the use of the wireless network 140 or in place of the wireless network 140 may be used. Such a wired connection may be used to collect data stored at the OBVMD when the OBVMD is connected to the host computer system or some other electronic device capable of collecting data from the OBVMD. For example, such a wired connection may be used when a driver returns from a delivery, or after a predetermined amount of time, such as once per day.

Figure 2:
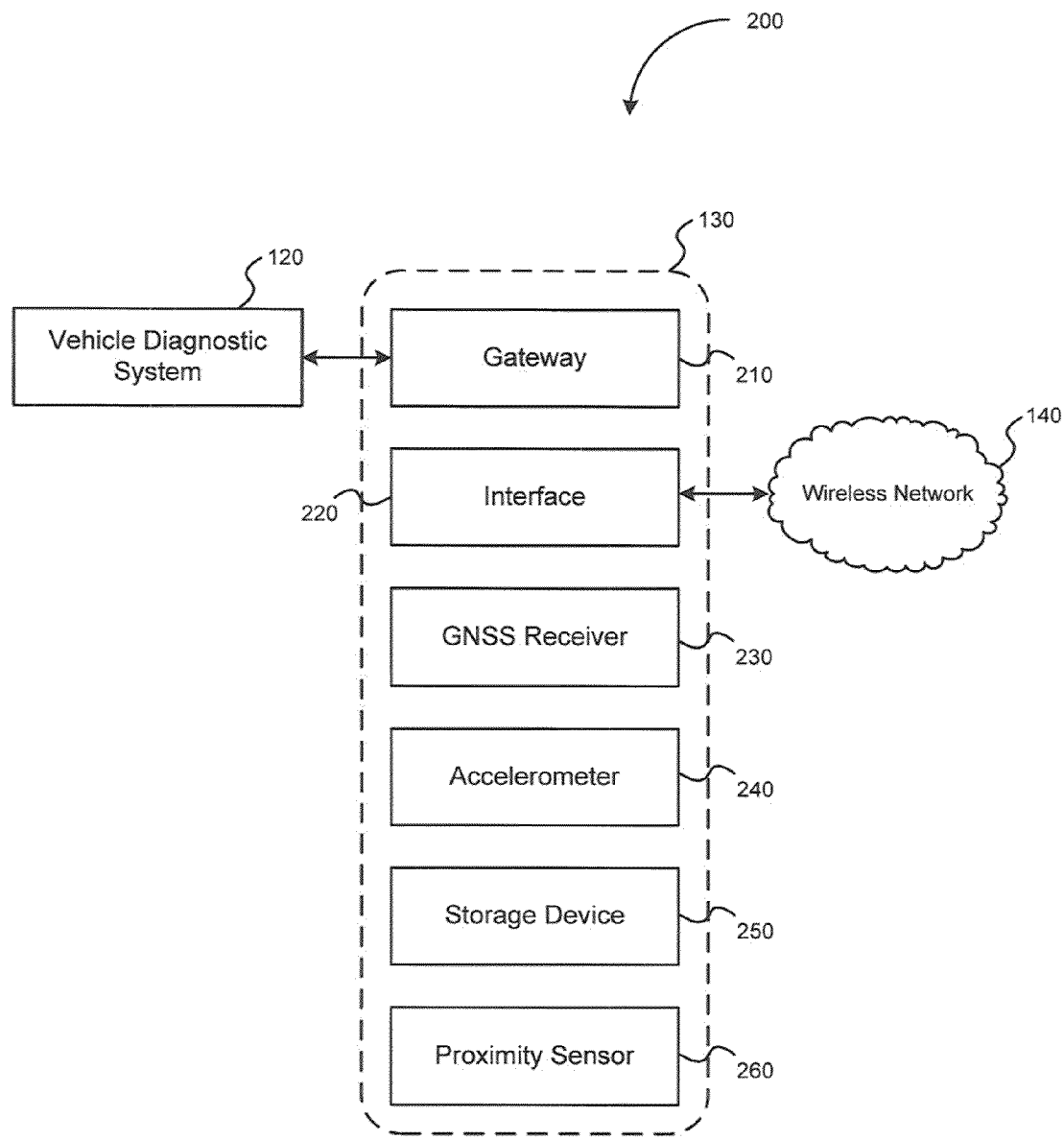
FIG. 2 illustrates a simplified block diagram of an embodiment of a system having an on-board vehicle monitoring device interacting with a wireless network and a vehicle diagnostic system.

FIG. 2 illustrates a more detailed block diagram of an embodiment of a system 200 having an OBVMD 130 interacting with a wireless network 140 and a vehicle diagnostic system 120. The OBVMD 130 of FIG. 2 may be the same OBVMD 130 of FIG. 1, or may be some other OBVMD. The OBVMD 130 may include: a gateway 210, an interface 220, a GNSS receiver 230, an accelerometer 240, a storage device 250, and/or a proximity sensor 260. Some or all of these components, such as the gateway 210 and interface 220 may be incorporated into one device or processor. Further, while the OBVMD 130 may be one integrated device, it may also include discrete components located variously throughout a vehicle and/or in communication via any appropriate wired and/or wireless connection.

In some embodiments, a gateway 210 is present. The gateway 210 may have the ability to receive information from the vehicle diagnostic system 120. This may involve the gateway 210 monitoring data gathered from various vehicle subsystems by the vehicle diagnostic system 120 and/or may involve the gateway 210 actively querying the vehicle diagnostic system 120 for data. Depending on the type of vehicle diagnostic system 120, the gateway 210 may need to be configured differently to interact with the vehicle diagnostic system 120. For example, the gateway 210 may include an application programming interface (API) to be able to access data stored in a vehicle's diagnostic system memory. The gateway 210 may receive requests for vehicle diagnostic system data from a host via the wireless network 140, or from other components of the OBVMD 130. In some embodiments, the gateway 120 gathers some or all information available from the vehicle diagnostic system 120 at various time intervals. In some embodiments, the gateway only gathers data from the vehicle diagnostic system 120 when requested by another component of the OBVMD 130 or the host. The gateway 210 may gather more data from the vehicle diagnostic system 120 based on other data it receives. For example, if the vehicle diagnostic system 120, accelerometer 240, or GNSS receiver 230, produces data stating that a exception has occurred (such as a "hard brake" event), more data at possibly more frequent intervals may be gathered from the vehicle diagnostic system 120 by the gateway 210.

In some embodiments, the OBVMD 130 includes an interface 220. The interface 220 may be capable of communicating with a host via a wireless network 140. The interface 220 may include an antenna being present at the OBVMD 130 or somewhere else inside or outside the vehicle. This antenna may be integrated with the antenna for the GNSS receiver. The interface may receive commands from the host via wireless network 140. The interface may also receive data from other components of the OBVMD 130 to be transmitted to the host.

In some embodiments, the OBVMD 130 includes a GNSS receiver 230. The GNSS receiver 230 may be capable of receiving information from a network of positioning satellites. The GNSS receiver 230 may include an antenna being present either at the OBVMD 130 or somewhere else within or outside the vehicle. A common form of GNSS is GPS. Therefore, the GNSS receiver 230 may be a GPS receiver. The GNSS receiver may provide other components of the OBVMD 130 with position data. In some embodiments, the raw position data (possibly coordinates and/or timing data) is transmitted to the host via the wireless network 140. In some embodiments, some or all of the gathered position data by the GNSS receiver 230 is stored at the storage device 250 of the OBVMD 130. Based on repeated position data being received, the host may be able to determine the vehicle's speed, direction, acceleration, and deceleration. Alternatively, the data gathered from the GNSS receiver 230 may be used at the vehicle to determine speed, direction, acceleration, and deceleration information. This computed information may then be transmitted to the host via the wireless network 140.

In some embodiments, an inertial sensing device (which is described herein as an accelerometer 240 but which might also include other devices with similar functionality) is present. The accelerometer 240 may provide an alternative (to the GNSS receiver 230) for determining acceleration and deceleration information. In some embodiments, both a GNSS receiver 230 and an accelerometer 240 are present. The acceleration and deceleration information gathered by the accelerometer 240 may be stored at storage device 250 and/or transmitted to the host via the wireless network 140. The accelerometer 240, GNSS receiver 230, or vehicle diagnostic system 120 registering high acceleration values (such as those consistent with the gas pedal pushed to full throttle) or high deceleration values (such as those consistent with a head-on impact and/or full application of the brakes, collectively referred to as a "hard-brake" event) may result in a message noting as such, along with a snapshot of vehicle and driver data being sent to the host via the wireless network 140.

Also, in addition to using the accelerometer 240 to determine acceleration and deceleration information, the same or a different accelerometer may be used to gather lateral acceleration and/or deceleration information. Such information may be useful if the vehicle swerves, slides, turns abruptly, and/or is involved in a side impact collision. The GNSS receiver 230 may also gather such information.

In some embodiments, a storage device 250 is present. The storage device 250 may be any form of computer-readable storage device. For example, the storage device 250 may be random access memory, flash memory, and/or a hard drive. The storage device 250 may store all or some data received and/or created by various OBVMD 130 components, including the gateway 210, interface 220, GNSS receiver 230, accelerometer 240, and/or proximity sensor 260. In some embodiments, the storage device 250 only stores data until it has been transmitted to the host via wireless network 140. The storage device 250 may store a RFF. The RFF may include some or all data received and/or created by various OBVMD 130 components for a particular period of time. For example, an RFF, whenever examined, may include data from each component of the OBVMD 130 for the previous 10 seconds, up to and including the present. The host may transmit to the interface 220 a request for an RFF. If such a request for an RFF is received, the storage device may also store data relating to another period of time, such as 5 seconds, following the reception of the request for the RFF. The information from the RFF may then be transmitted to the host via wireless network 140. Therefore, the RFF would include data for a period of time prior to receiving the request, the time of the request, and/or a period of time following the request. Such information may be useful to reconstruct events resulting in a vehicular accident. Besides a request from the host, an RFF stored at the storage device 250 may be transmitted to the host at regular intervals, or on the occurrence of some predetermined event, such as a hard brake event.

In some embodiments, a proximity sensor 260 is present. As those with skill in the art will understand, proximity sensors may utilize many different techniques to detect the presence of another object, including: inductive, capacitive, magnetic, sonar (both active and passive), laser, radar, thermal, and optical, to name several examples. The proximity sensor, while illustrated as part of the OBVMD 130, may be located at some other location on the vehicle while remaining communicatively coupled with the OBVMD 130. The proximity sensor 260 may be able to detect whether an object (such as another vehicle) is present in front (or to the side or back) of the vehicle within a certain distance. It may also be able to determine the distance between the vehicle and the object. The proximity sensor 260 may also be able to determine the direction from which an object has entered the path of the vehicle. For example, if an object enters the on-coming path of the vehicle from the side, at a close distance, this may be consistent with the driver executing a potentially dangerous maneuver of "cutting-in" to traffic. The proximity sensor 260 may also be used to detect tailgating (i.e. the following of another vehicle at a dangerously close distance). The detection of tailgating or a cut-in may trigger a RFF, a message, and/or other data to be transmitted to the host via wireless network 140. A "cut-in" may be defined as an object or vehicle entering the proximity sensor's field of view within a certain distance, from the side, and the distance between the vehicle and the object subsequently increasing.

Figure 3:
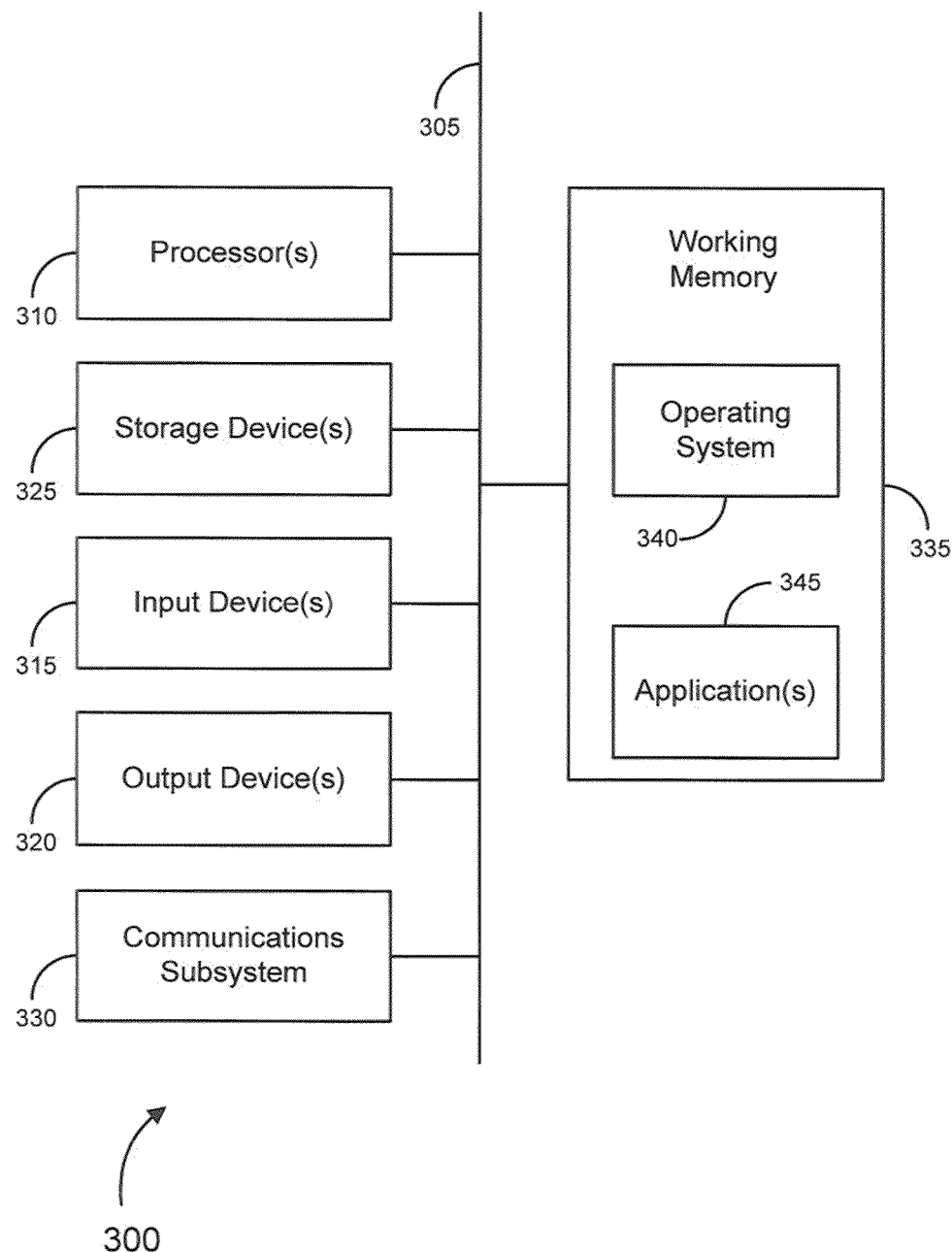
FIG. 3 provides a schematic illustration of one embodiment of a computer system that may perform the methods provided by various other embodiments and function as the host computer system.

FIG. 3 provides a schematic illustration of one embodiment of a computer system 300 that can perform the methods provided by various other embodiments, as described herein, and/or can function as the host computer system ("host") 140 of FIG. 1. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include one or more processors 310, including without limitation one or more general-purpose processors and/or one or more special-purpose processors (such as digital signal processing chips, graphics acceleration processors, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like.

Such storage devices may be configured to implement any appropriate data stores, including without limitation, various file systems, database structures, and/or the like.

The computer system 300 might also include a communications subsystem 330, which can include without limitation a modem, a network card (wireless or wired), an infra-red communication device, a wireless communication device and/or chipset (such as a BLUETOOTH device, an 802.11 device, a WiFi device, a WiMax device, cellular communication facilities, etc.), and/or the like. The communications subsystem 330 may permit data to be exchanged with a network (such as the network of FIG. 4), other computer systems, and/or any other devices described herein. In many embodiments, the computer system 300 will further comprise a working memory 335, which can include a RAM or ROM device, as described above.

The computer system 300 also can comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another computer-readable medium, such as one or more of the storage device(s) 325. Merely by way of example, execution of the sequences of instructions contained in the working memory 335 might cause the processor(s) 310 to perform one or more procedures of the methods described herein.

The terms "machine readable medium" and "computer-readable medium," as used herein, refer to any medium that participates in providing data that causes a machine to operate in a specific fashion. In an embodiment implemented using the computer system 300, various computer-readable media might be involved in providing instructions/code to processor(s) 310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 325. Volatile media includes, without limitation, dynamic memory, such as the working memory 335. Transmission media includes, without limitation, coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infra-red data communications).

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/ or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
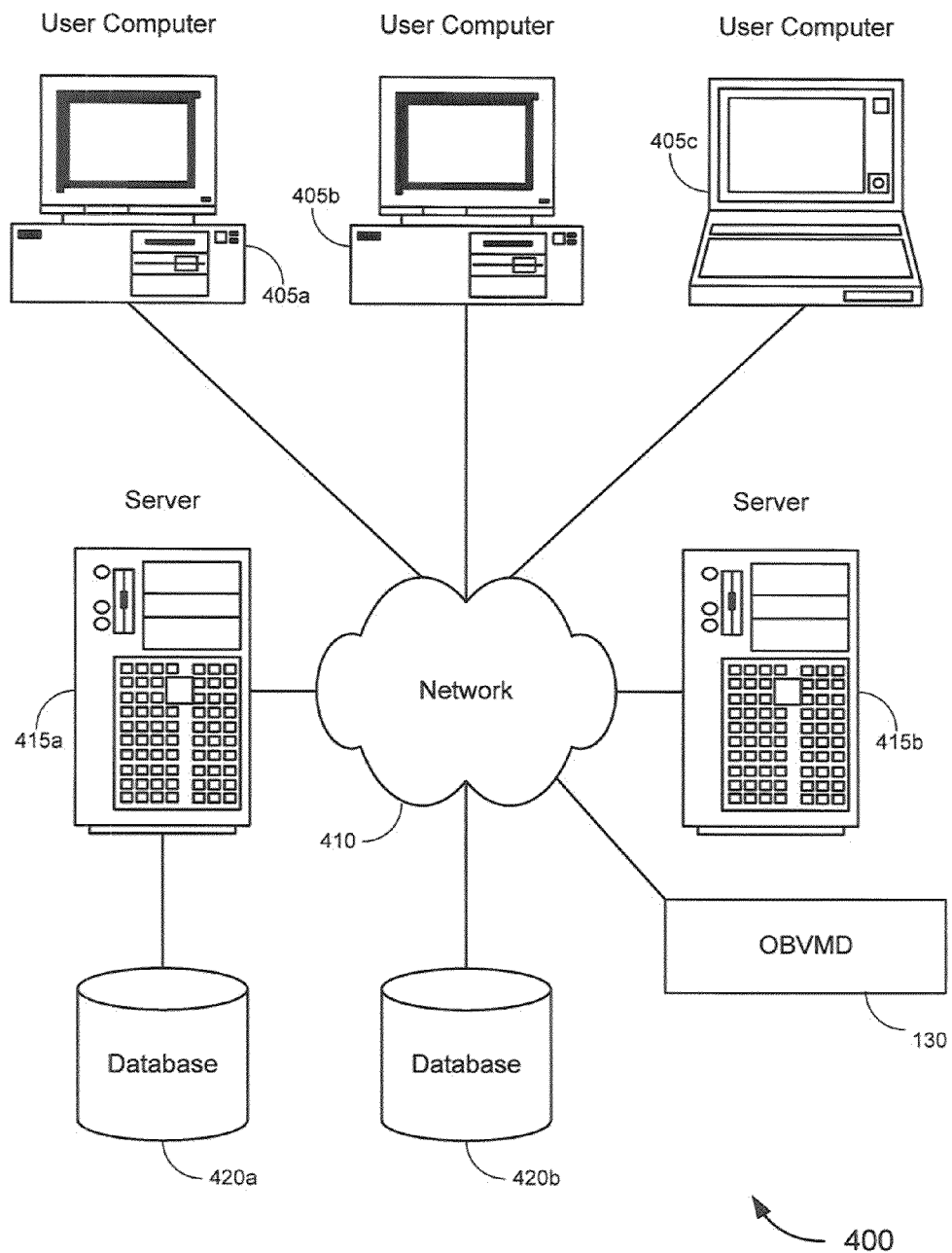
FIG. 4 illustrates a schematic diagram of a system 400 that may be used as, or function in conjunction with, the host computer system.

The host computer system of FIGS. 1 and 3 may be a single computer, or multiple computers arranged in a network. Merely by way of example, FIG. 4 illustrates a schematic diagram of a system 400 that can be used in accordance with one set of embodiments. The system 400 can include one or more user computers 405. The user computers 405 can be general purpose personal computers (including, merely by way of example, personal computers and/or laptop computers running any appropriate flavor of MICROSOFT's WINDOWS and/or APPLE's MACINTOSH operating systems) and/or workstation computers running any of a variety of commercially-available UNIX or UNIX-like operating systems. These user computers 405 can also have any of a variety of applications, including one or more applications configured to perform methods provided by various embodiments (as described above, for example), as well as one or more office applications, database client and/or server applications, and/or web browser applications. Alternatively, the user computers 405 can be any other electronic device, such as a thin-client computer, Internet-enabled mobile telephone, and/or personal digital assistant, capable of communicating via a network (e.g., the network 410 described below) and/or displaying and navigating web pages or other types of electronic documents. Although the exemplary system 400 is shown with three user computers 405, any number of user computers can be supported.

Certain embodiments of the invention operate in a networked environment, which can include a network 410. The network 410 can be any type of network familiar to those skilled in the art that can support data communications using any of a variety of commercially-available (and/or free or proprietary) protocols, including without limitation TCP/IP, SNA, IPX, APPLETALK, and the like. Merely by way of example, the network 410 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the BLUETOOTH protocol known in the art, and/or any other wireless protocol; and/or any combination of these and/or other networks.

Embodiments of the invention can include one or more server computers 415. Each of the server computers 415 may be configured with an operating system, including without limitation any of those discussed above, as well as any commercially (or freely) available server operating systems. Each of the servers 415 may also be running one or more applications, which can be configured to provide services to one or more clients 405 and/or other servers 415.

Merely by way of example, one of the servers 415 may be a web server, which can be used, merely by way of example, to process requests for web pages or other electronic documents from user computers 405. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 405 to perform methods of the invention. Therefore, an interface may be presented to a user remote from any particular host computer system via the presentation of a web-based user interface.

The server computers 415, in some embodiments, might include one or more application servers, which can be configured with one or more applications accessible by a client running on one or more of the client computers 405 and/or other servers 415. Merely by way of example, the server(s) 415 can be one or more general purpose computers capable of executing programs or scripts in response to the user computers 405 and/or other servers 415, including without limitation web applications (which might, in some cases, be configured to perform methods provided by various embodiments). Merely by way of example, a web application can be implemented as one or more scripts or programs written in any suitable programming language, such as JAVA, C, C# or C++, and/or any scripting language, such as Perl, Python, or TCL, as well as combinations of any programming and/or scripting languages. The application server(s) can also include database servers, including without limitation those commercially available from ORACLE, MICROSOFT, SYBASE, IBM and the like, which can process requests from clients (including, depending on the configuration, dedicated database clients, API clients, web browsers, etc.) running on a user computer 405 and/or another server 415. In some embodiments, an application server can create web pages dynamically for displaying the information in accordance with various embodiments, such as a user interface appropriate to allow a user to view driver and/or vehicle data. Data provided by an application server may be formatted as one or more web pages (comprising HTML, JAVASCRIPT, etc., for example) and/or may be forwarded to a user computer 405 via a web server (as described above, for example). Similarly, a web server might receive web page requests and/or input data from a user computer 405 and/or forward the web page requests and/or input data to an application server. In some cases a web server may be integrated with an application server.

In accordance with further embodiments, one or more servers 415 can function as a file server and/or can include one or more of the files (e.g., application code, data files, etc.) necessary to implement various disclosed methods, incorporated by an application running on a user computer 405 and/or another server 415. Alternatively, as those skilled in the art will appreciate, a file server can include all necessary files, allowing such an application to be invoked remotely by a user computer 405 and/or server 415.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420. The location of the database(s) 420 is discretionary: merely by way of example, a database 420a might reside on a storage medium local to (and/or resident in) a server 415a (and/or a user computer 405). Alternatively, a database 420b can be remote from any or all of the computers 405, 415, so long as it can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 435 can be a relational database, such as an ORACLE database, that is adapted to store, update, and retrieve data (such as stored driver and/or vehicle data) in response to SQL-formatted commands. The database might be controlled and/or maintained by a database server, as described above, for example.

Also illustrated in the embodiment of FIG. 4 is OBVMD 130. OBVMD 130 may communicate with the various computers and/or servers of FIG. 4 functioning as the host computer system via network 410, or a separate network (not pictured), such as a cellular wireless network.

The OBVMD 130 of FIGS. 1 and 2 may communicate via wireless network 140 with a host computer system, or network of computers serving as the host computer system, as described above in relation to FIGS. 3 and 4. At the host computer system, data received from the OBVMD 130 may be compiled, sorted, organized, stored, and/or displayed to provide a user, such as a fleet manager, with information regarding the performance of vehicles and the drivers operating the vehicles. Based upon the OBVMD 130 transmitting information regarding a location, acceleration, deceleration, proximity, vehicle diagnostics and/or "hard-brake" events, a large amount of information may be presented to a user or calculated and/or compiled then presented to a user.

Notably, information regarding particular drivers and/or vehicles may be compiled over lengthy periods of time as the user wishes. A user may be able to view data spanning weeks, months, or years for a particular vehicle and/or driver. The user may also be able to customize how the vehicle and/or driver is recorded and compiled. For example, the user may not want data gathered during trips below a certain distance, time period, speed, engine RPM, and/or ignition on-time to be considered. Further, the definition of what constitutes a trip, may vary per driver. For example, a driver typically performing short haul routes may have a differed trip definition than a driver performing long haul routes. Based upon these definitions, the user interface may screen out such trips from being included in metrics affecting the vehicle and/or driver.

A user interface, possibly a graphical user interface, may be provided at the host computer system to allow the user to easily interact with the raw and compiled driver and vehicle data. The user interface may allow the user view various categories of statistics derived from the data received at the host computer. For example, various windows of the user interface may allow the user to compare statistics of various drivers, define which categories of data will be displayed, query vehicles for current vehicle and/or driver data, and define various parameters for what data is used to calculate the statistics. For example, the user may wish to eliminate any data gathered when the trip driven by the driver was less than 2 minutes. Or, as another example, the user may wish to be presented statistics showing safety performance trends of all drivers, or a select group of drivers, over a period of time, such as 12 weeks. The following several figures provide various examples of windows that may be provided to a user based upon data received at the host computer system from the OBVMD. As a person of ordinary skill in the art will understand, the following categories of data may be rearranged and resorted into various windows and formats present the user with alternative views of the vehicle and driver data.

For example, FIG. 5 illustrates an embodiment of a window from a user interface displaying a summary driver report 500 to a user. In such a report 500, at least one vehicle or driver is listed in the driver column 510. The driver of a particular vehicle may be identified several ways: a particular vehicle may always be associated with a particular driver, based upon a time a trip occurred, the driver may be known, the driver may be required to identify himself via an input device in the vehicle, or the driver may be required to notify a user of the host. The odometer column 520 may display the current mileage associated with particular drivers or vehicles. The date field column 530 may represent the dates the last trips were taken by the driver, or the date the last information was received from a OBVMD associated with the driver. The time column 540 may represent the last time information was received from the OBVMD associated with the driver. Location column 550 may represent the addresses (or addresses nearest the coordinates received from the vehicle's OBVMD). In some embodiments, the location data is merely a set of coordinates. Such coordinates, or address data, may be overlaid onto a map for display at the host computer system. Status 560 may be based upon what gear the vehicle is in, or may be based upon the vehicle's location (as measured by the GNSS received) remaining stationary for an amount of time.

FIG. 6 illustrates an embodiment of a window from a user interface displaying a diagnostic report 500 to a user. Such a window may be displayed if a particular vehicle or driver is selected. Such a window may display some or all of the diagnostic data received from a particular vehicle. For example, the date/time first reported column 610 may indicate when a diagnostic code was first received from the associated vehicle's OBVMD. The date/time last reported column 620 may indicate when the diagnostic code was last received from the vehicle's OBVMD (the same diagnostic code may be sent repeatedly, such as every time the problem occurs, or every ignition cycle). The status column 630 may indicate whether the problem is active or not. ECU (Electronic Control Unit) Description Column 640 may indicate an in-vehicle computer as the source triggering the fault. This may be a computer controlling and/or monitoring the engine, transmission, instrumental cluster or any other vehicle component. FMI (Failure Mode Identifier) Description column 650 may indicate the specific trouble with a vehicle component. Such a trouble may be determined by a monitored parameter such as a voltage, temperature, frequency, etc. being above or below a predetermined threshold. These may be standard codes associated with the vehicle's diagnostic system. The count column 660 may provide the number of times a particular fault and/or diagnostic code has been received. Finally, a freeze frame column 670 may indicate whether a freeze frame (containing vehicle diagnostic information from before, during, and/or after the event causing the diagnostic code to be triggered) is available.

Figure 7:
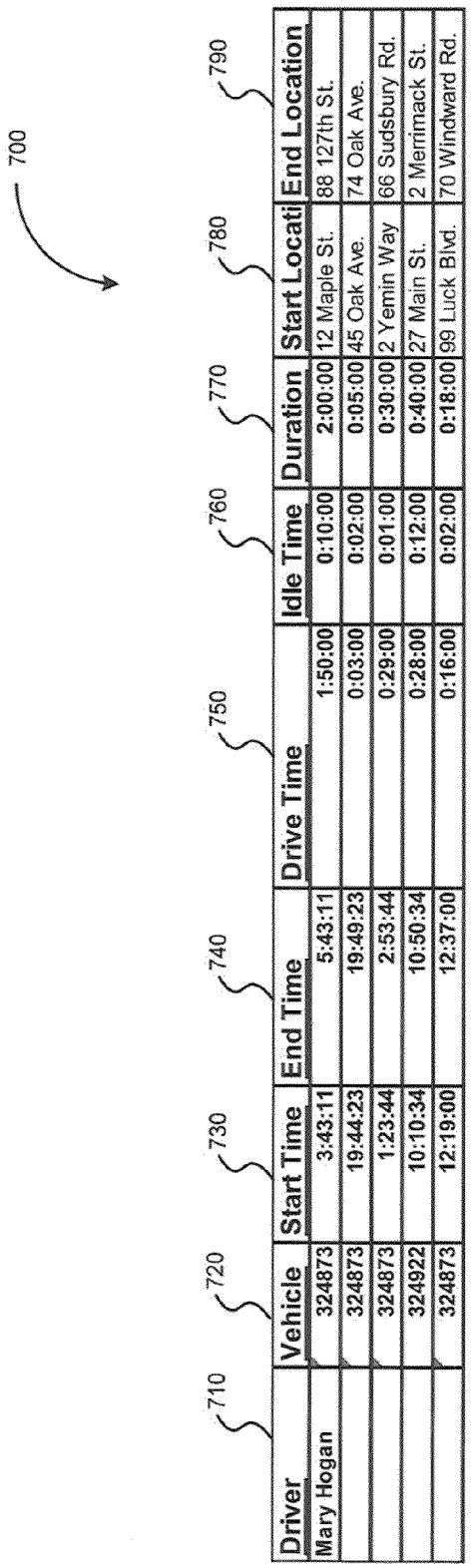
FIG. 7 illustrates an embodiment of a window from a user interface displaying a driver report.

FIG. 7 illustrates a driver report 700 window from a user interface display that may be displayed at the host computer system to a user. The driver report window may have: a driver column 710, a vehicle column 720, a start time column 730, an end time column 740, a drive time column 750, an idle time column 760, a duration column 770, a start location column 780 and an end location column 790. For example, the addresses in the start location column 780 and the end location column 790 may be determined based on the GNSS coordinates the ignition was turned on and off at. These columns may link to a map showing the start location, end location, and/or the entire route the vehicle took between the start and end locations. The duration column 770 may reflect the amount of time the ignition was turned on (possibly determined from vehicle diagnostic data). Idle time column 760 may reflect the amount of time the ignition was on, but the vehicle was idling or moving below minimum speed threshold. The drive time column may reflect the amount of time the vehicle was moving above the specified minimum speed threshold. The start time column 730 may reflect the time at which the ignition was turned on, with the end time column 740 reflecting the time the ignition was turned off. The vehicle column 720 may reflect what vehicle was driven by the driver listed in column 710. Alternatively, the report may be able to be sorted by vehicle to show trip data regarding each driver that has driven that particular vehicle.

Figure 8:
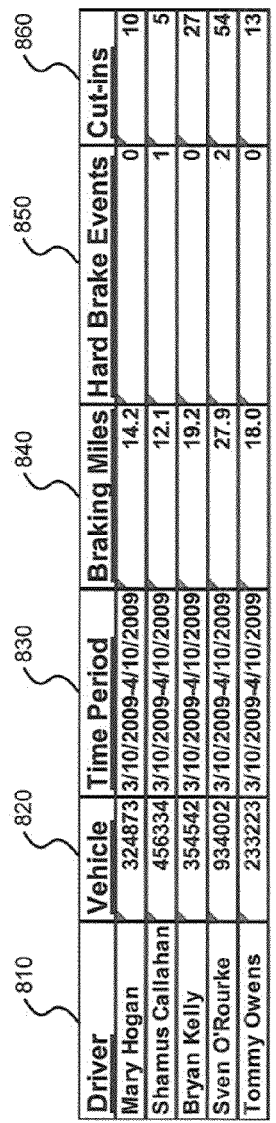
FIG. 8 illustrates an embodiment of a window from a user interface displaying a brake report.

FIG. 8 illustrates a brake report 800 window from a user interface display that may be displayed at the host computer system to a user. The brake report 800 may display categories of information such as: a driver column 810, a vehicle column 820, a time period column 830, a braking miles column 840, a hard brake events column 850, and a cut-ins column 860. The driver column 810 may list some or all of the drivers associated with a fleet of vehicles. In some embodiments, only those drivers who have failed to meet certain benchmarks for driving performance are displayed. The vehicle column 820 may list a number or other identifier associated with a particular vehicle. The time period column 830 may represent the time period that the braking data is sampled from. The braking miles column 840 may list the total number of miles traveled while the brakes were being applied during the time period listed in time period column 830. The hard brake events column 850 may list the total number of hard brake events during a the time period of column 830. The hard brake events may be measured by data received from the vehicle diagnostic system, deceleration measured by an accelerometer, and/or deceleration measured by a GNSS receiver. Also, hard brake events may be associated with crashes and/or accidents. Cut-ins column 860 may list the total number of cut-ins during that time period of column 830. The data for cut-ins column 860 may be based on data received from a proximity sensor.

Figure 9:
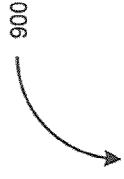
FIG. 9 illustrates an embodiment of a window from a user interface displaying a fuel usage report.

FIG. 9 illustrates a fuel usage report 900 window from the user interface display that may be displayed at the host computer system to the user. The fuel usage report 900 may display categories of information such as: a driver column 910, a miles per gallon column 920, an engine on-time column 930, a sudden acceleration column 940, an engine average revolutions per minute column 950, a top-tier turn column 960, a break count column 970, a fuel use column 980, and a benchmark column 990. As in the previous figures, driver column 910 may list some or all the drivers associated with the fleet vehicles. The data in miles per gallon column 920 may represent the average miles per gallon that the driver listed in column 910 has maintained over a predetermined time period. The data for the miles per gallon column 920 may be received at the OBVMD from the vehicle diagnostic system if available, or may be estimated at the OBVMD using speed, acceleration, braking, engine, and other various categories of information. Engine on time column 930 may represent the total time the engine of the vehicle has been running well operated by driver listed in column 910.

The sudden acceleration column 940 may list the number of instances the driver listed in column 910 has accelerated his vehicle at a greater rate than some predetermined value. The data for this column may be measured using information gathered from the vehicle's diagnostic system, the GNSS receiver, or an accelerometer. The average locations per minute column 950 may contain data describing the average revolutions per minute the engine of the vehicle operated by the driver listed in column 910 rotated at. For example, a high average revolutions per minute may equate to the driver leaving the vehicle in a low gear for too long of time, or driving at too high of a speed. The data for the average revolutions per minute column 950 may be gathered from the vehicle's diagnostic system. Likewise, data for the top gear time column 960 may be received from the vehicle's diagnostic system. The data in top gear time column 960 may equate to the amount of time that the vehicle has spent driving in its highest gear. Driving in top gear may equate to more efficient driving, such as cruising at a steady pace at highway speeds. It may be necessary to configure at the user interface the transmission gear ratio equating to top gear.

The brake count column 970 may contain data stating the number of times the brakes of the vehicle have been applied by the associated driver. Again, such data may be gathered from the vehicle's diagnostic system. An unusually high brake count may equate to the driver repeatedly tapping the brakes, or applying the brakes too often. The fuel use column 980 may also list data gathered from the vehicle's diagnostic system. This data may include information on the number of gallons of fuel consumed by the vehicle while being operated by the driver listed in column 910. The benchmark column 990 shows an example of benchmark data. Here, benchmarks on the amount of fuel used have been established. For example, for driver Mary Hogan a fuel benchmark of 400 (gallons) has been established. This driver has only used 343 gallons of fuel according to the data of column 980. Therefore, this driver has successfully met the benchmark for fuel use set for her. However, a different driver, Bryan Kelly, has a benchmark fuel use of 500 gallons. Notably, different drivers may have different benchmarks due to known variances in the type of driving they will be performing. For example, one driver may have to perform local deliveries, while another may be performing long-haul driving on a highway. In the case of driver Bryan Kelly, his fuel use, as listed in fuel use column 980, exceeds his benchmark value listed in column 990. This may result in an alert being sent to the user of the interface, and/or to driver Bryan Kelly. Notably, in FIG. 9 a benchmark is only shown for fuel use. However, a benchmark may be displayed for any category of data. Beyond providing a visual comparison between the benchmark and its associated data category, as in columns 980 and 990, a window may display whether a driver has or has not met a particular benchmark. For example, in FIG. 9, column 990 may be configured to state either "yes" or "no," thereby indicating whether the associated driver has met his or her benchmark for fuel use.

As those with skill in the art will understand, the windows shown in FIGS. 5, 6, 7, 8, and 9 only represent examples of how various categories of data may be arranged. For example, all of the data contained in these figures may be combined into one window, or rearranged in various other permutations for display. How all these windows and categories of data are displayed may be configurable by the user. Further, many other categories of data may be displayed based on data created by the OBVMD and/or received from the vehicle's diagnostic system. For example other possible categories of data may include: 1) following distance data, as determined using a proximity sensor to determine the distance between the vehicle and a preceding vehicle; 2) maximum speed; 3) maximum RPM; 4) stop count; 5) fuel use during idle; 6) miles traveled in a particular speed range; 7) miles traveled in a particular RPM range; 8) coasting time ignition cycles; and 9) a location where a fault occurred. Further, besides display of the data to a user, the data may be exported in various formats, such as a comma delimited text file, for download, or for use in other programs.

Figure 10:
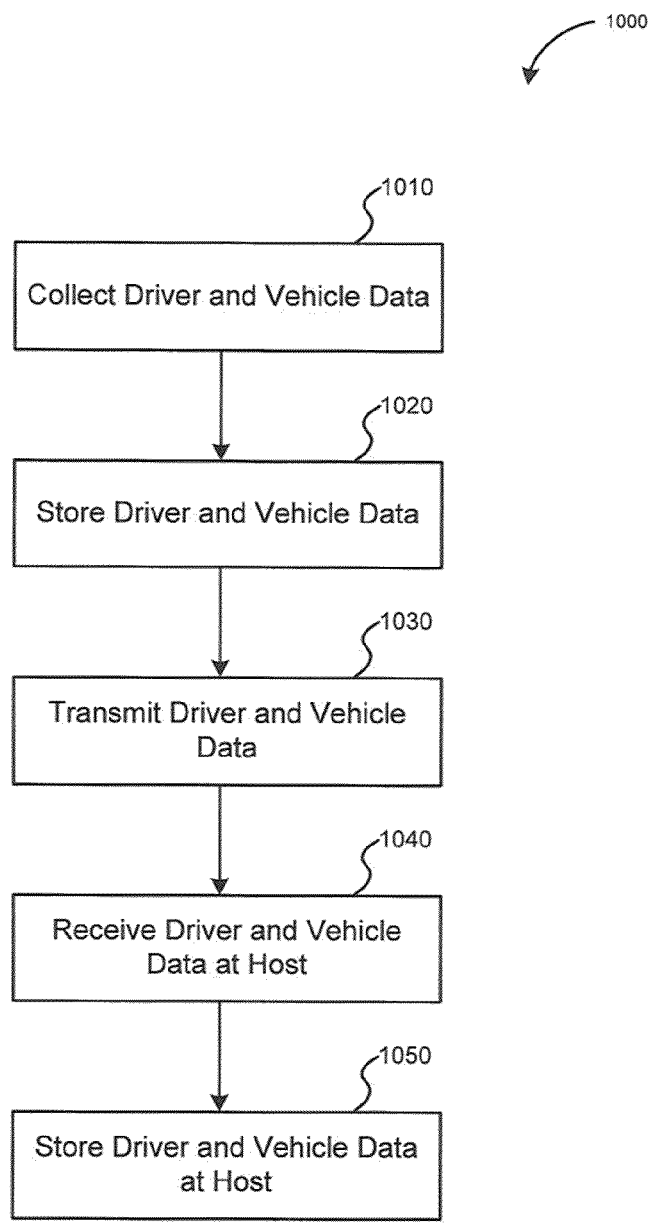
FIG. 10 illustrates an embodiment of a method for obtaining driver and vehicle data at the host system.

FIG. 10 illustrates an embodiment of a method 1000 for obtaining driver and vehicle data at the host system. At block

1010, the OBVMD may collect driver and vehicle data. As previously described, this may include interfacing with a vehicle diagnostic system and collecting data via sources such as a proximity sensor and/or a GNSS receiver. As driver and vehicle data are collected, the data may be stored in a computer-readable storage device located on the OBVMD at block 1020. Once a predetermined amount of time for a predetermined amount of data has been collected, some or all of the driver and vehicle data may be transmitted via wireless network to a host computer system, at block 1030. The driver and vehicle data may then be received at the host computer system at block 1040. The driver and vehicle data previously stored at the OBVMD at block 1020 may be deleted or may be retained. Whether such data is deleted or retained may involve receiving a confirmation that the driver and vehicle data has been successfully received at the host computer system. Once the driver and vehicle data has been received at the host at block 1040, some or all the driver and vehicle data may be stored at the host computer system at block 1050.

Figure 11:
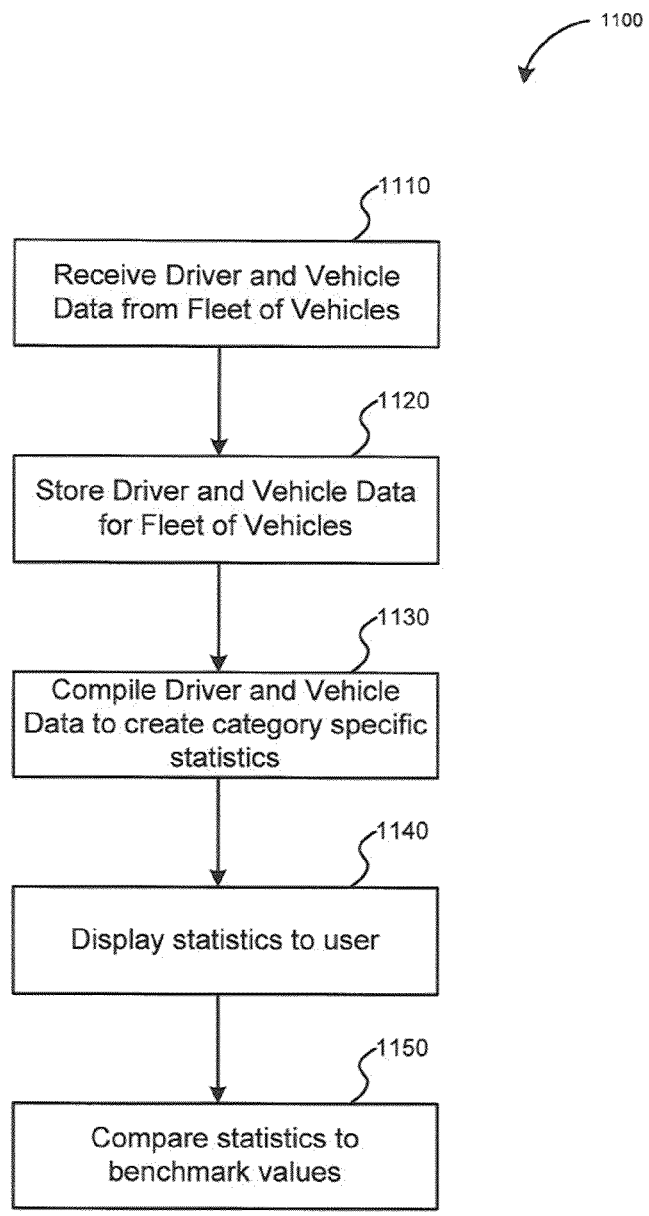
FIG. 11 illustrates an embodiment of a method for receiving and compiling driver and vehicle data from a fleet of vehicles at the host computer system.

FIG. 11 illustrates an embodiment of a method 1100 for receiving and compiling driver and vehicle data from a fleet of vehicles at the host computer system. At block 1110, driver and vehicle data may be received from multiple vehicles at the host computer system. This may involve various different OBVMDs located on various different vehicles transmitting driver and vehicle data at various times. Some or all of this driver and vehicle data received from multiple vehicles may be stored at the host computer system at block 1120. The store driver and vehicle data may be used to create statistics specific to particular categories at block 1130. For example, statistics may be compiled according to the category of the driver's name, a particular vehicle, miles traveled, miles per gallon, or any other category to produce useful information to be displayed to the user. Compiling the driver and vehicle data into statistics may also include summarizing large volumes of data for quick reference by the user. For example, while the data may indicate the direction, speed, and miles per gallon of the vehicle, for each one minute increment of a trip, this data may be summarized into an average miles per gallon, average speed, start point, an endpoint for an entire trip. Following the driver and vehicle data being compiled at block 1130, some or all these statistics may be displayed to the user, at block 1140. Further, the host computer system may compare the statistics to benchmark values, at block 1150. Such a comparison may involve a display of whether a vehicle and/or driver has or has not met a particular benchmark. In some embodiments, the benchmark values may be displayed for comparison to the statistics compiled from the driver and vehicle data.

Figure 12:
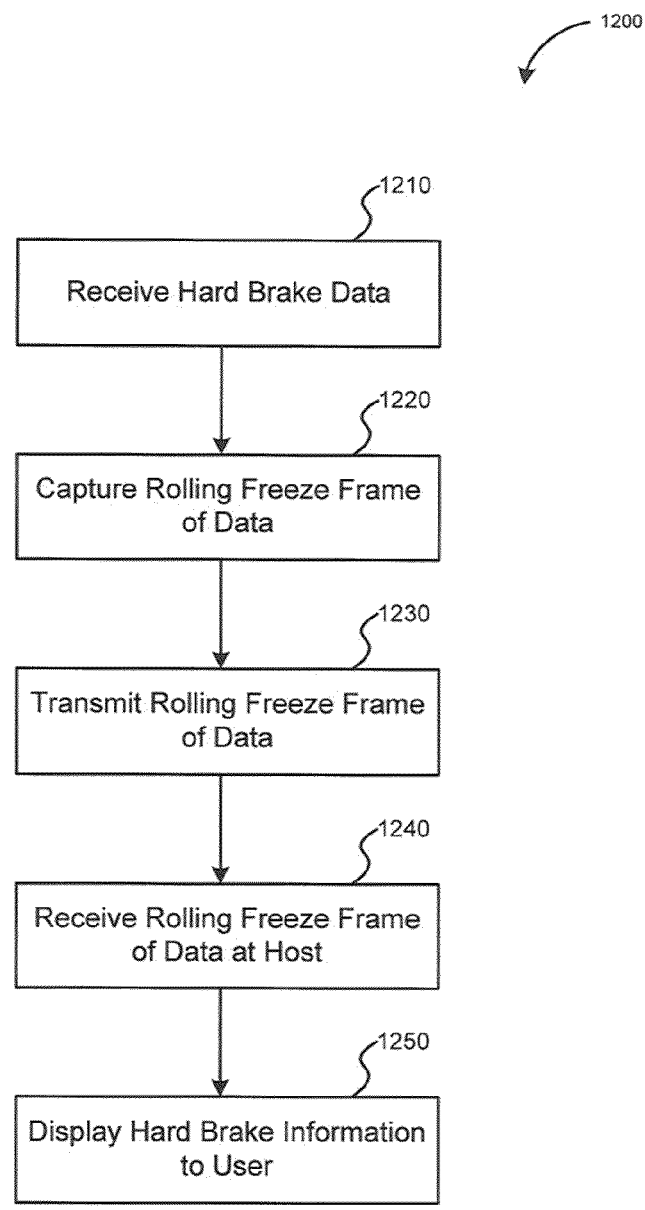
FIG. 12 illustrates an embodiment of a method for transmitting exception data.

In FIG. 12, an embodiment of a method 1200 is illustrated for transmitting exception data, such as data related to a hard brake event. At block 1210, the OBVMD may receive an indication that a hard brake event has occurred. Notably, while method 1200 is described as relating to hard brake events, it may also be applied to other forms of exceptions. For example, a diagnostic fault may also trigger a rolling freeze-frame (RFF) data to be transmitted to the host. An indication of an exception, such as a hard brake event, may come from a GNSS receiver, an accelerometer, or vehicles diagnostic system. Upon receiving an indication that a hard brake has occurred, rolling freeze frame of vehicle and driver data may be captured and stored at the OBVMD at block 1220. This rolling freeze frame of data may include vehicle and driver data spanning a period of time prior to the hard brake event, during the hard brake event, and following the hard brake event. The rolling freeze-frame of data may include data captured from the vehicle diagnostic system and/or from subsystems of the OBVMD. Following some or all of the rolling freeze-frame data being captured, some or all of the rolling freeze-frame of data may be transmitted to the host computer system, at block 1230. Following transmission, some or all of the rolling freeze-frame of data may be received at the host computer system at block 1240. Following the reception of some or all the rolling freeze-frame data, information relating to the hard brake event may be stored and/or displayed to the user at block 1250. This may involve the user being immediately notified (such as by email or text message) that a hard brake event has occurred. Alternatively, information relating to the hard brake may be stored until such information is accessed by the user.

Figure 13:
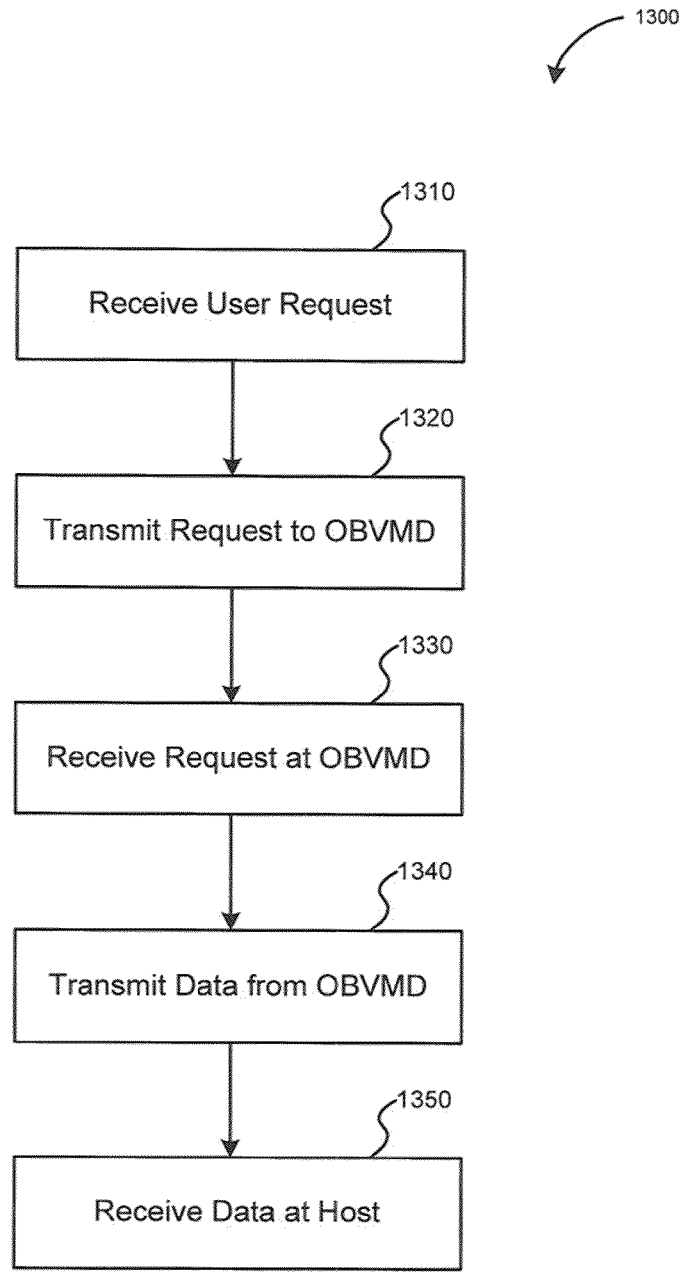
FIG. 13 illustrates an embodiment of a method for requesting data from an on-board vehicle monitoring device.

Referring to FIG. 13, an embodiment of a method 1300 is illustrated for requesting data from an OBVMD by a user. Such a request may result in real-time or near real-time vehicle and driver data being sent to the host computer system from the OBVMD. First, a user request for data from an OBVMD may be received at the host computer, at block 1310. The user may have made this request for data from an OBVMD on a particular vehicle, or for data from some or all of the vehicles in a fleet of vehicles. Following the request being received, the request may be transmitted to the appropriate OBVMDs at block 1320. Following transmission through the wireless network, the request may be received at the OBVMD at block 1330. Such a request may be for a particular category of data, such as miles per gallon, or may be for a general status update on the vehicle, such as the vehicle's location, direction, speed, and whether any diagnostic faults have occurred, In some embodiments, the user may be able to remotely modify how the OBVMD collects data. For example, the user may be able to edit the amount of data collected for RFFs, or the conditions under which an RFF is transmitted to the host computer system. Following reception of the request for data, data may be transmitted from the OBVMD to the host computer system via a wireless network at block 1340. The data may then be received at the host computer system at block 1350.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system for remotely tracking vehicle and driver behavior, the system comprising:
   an on-board vehicle monitoring device of a vehicle, comprising an interface device, a proximity sensor communicatively coupled with the on-board vehicle monitoring device, and a gateway device, wherein
   the interface device collects information from a diagnostic system of the vehicle,
   the gateway device collects a set of vehicle operating data corresponding to a driver or vehicle behavior, the set of vehicle operating data comprising at least some of the information from the diagnostic system of the vehicle, and transmits at least a portion of the set of vehicle operating data to a host-computer system via a wireless network; and
   the proximity sensor detects a presence of a physical object within a specified distance in front and to a side of the vehicle, provides the on-board vehicle monitoring device information regarding the physical object within the predetermined distance of the vehicle to determine a direction from which the physical object enters a path of the vehicle, and provides the on-board vehicle monitoring device an instruction to transmit a particular window of operating data of the vehicle based on movement of the physical object detected by the proximity sensor; and
   the host-computer system, comprising a processor and a computer-readable storage medium, the computer-readable storage medium having encoded thereon a set of instructions to control operation of the host computer system, the set of instructions comprising:
   instructions for receiving the at least a portion of the set of vehicle operating data;
   instructions for compiling driver behavior data, based at least in part on analysis of the received vehicle operating data;
   instructions for providing a user interface; and
   instructions for causing the user interface to display, for a user, information corresponding to the compiled driver behavior data.

2. The system of claim 1, wherein the on-board vehicle monitoring device further comprises a speed and acceleration sensing device and the gateway device is configured to transmit speed and acceleration information to the host-computer system.

3. The system of claim 2, wherein the speed and acceleration sensing device comprises a global navigation satellite system ("GNSS") receiver.

4. The system of claim 2, wherein the speed and acceleration sensing device comprises an accelerometer.

5. The system of claim 1, wherein the on-board vehicle monitoring device also receives information from a global navigation satellite system ("GNSS") receiver, and information from the GNSS receiver comprises at least some of the vehicle operating data.

6. The system of claim 1, wherein the interface device is configured to receive information from the diagnostic system of the vehicle that a "hard brake" event has occurred.

7. The system of claim 6, wherein, upon a "hard brake" event occurring, the on-board vehicle monitoring device is triggered to store a window of vehicle operating data for a first period of time prior to and including the "hard brake" event.

8. The system of claim 7, wherein the window of vehicle operating data that includes a second period of time following the "hard brake" event.

9. The system of claim 8, wherein the window of vehicle operating data is transmitted to the host computer system from the on-board vehicle monitoring device.

10. The system of claim 1, wherein the interface device is configured to receive information from the diagnostic system of the vehicle that a vehicle fault has occurred.

11. The system of claim 1, wherein the on-board vehicle monitoring device is further configured to determine and transmit location data.

12. The system of claim 1, wherein the user-interface is web based, thereby allowing for remote access to vehicle and driver behavior information.

13. The system of claim 1, wherein the host computer system further comprises a database configured to store vehicle and driver behavior from the plurality of on-board vehicle monitoring devices.

14. A method for tracking vehicle and driver behavior, the method comprising:
   receiving, at an on-board vehicle monitoring device (OBVMD) from a proximity sensor, a trigger to initiate transmission of a particular window of vehicle operating data based on movement detected by the proximity sensor of a particular vehicle other than a vehicle associated with the OBVMD;
   querying, via a user interface device that is stored on a computer-readable storage medium of a host computer system, a diagnostic system of the vehicle associated with the OBVMD for vehicle operating information;
   receiving, at the user interface device, the vehicle operating information from the diagnostic system of the vehicle,
   transmitting, via a wireless network, from the OBVMD to the host computer system, a set of vehicle operating data;
   receiving, via the wireless network, at the host computer system, the set of vehicle operating data;
   compiling, at the host computer system, the receiving vehicle operating data;
   storing, at the host computer system, the compiled vehicle operating data;
   providing a user interface; and
   displaying, at the user interface, information corresponding to the compiled vehicle operating data.

15. The method of claim 14, wherein the trigger condition is a "hard brake" event.

16. The method of claim 14, wherein the set of vehicle operating data includes coordinates capable of being used to determine a physical location.

17. The method of claim 14, wherein the set of vehicle operating data includes a subset of data corresponding to each of the following:
   miles per gallon,
   driving time,
   ignition cycles, and
   distance traveled.

18. The method of claim 14, wherein the set of vehicle operating data includes data gathered during a first period of time preceding the trigger, a second period of time including the trigger, and a third period of time following the trigger.

19. An apparatus comprising:
a computer-readable storage medium having encoded thereon a computer-readable program comprising a set of instructions for directing operation of a computer system, the set of instructions comprising:
instructions for transmitting a trigger from a proximity sensor of a first vehicle to a first on-board vehicle monitoring device of the first vehicle to query a first diagnostic system for a first set of vehicle operating data based on movement detected by the proximity sensor of a particular vehicle other than the first vehicle;
instructions for receiving the first set of vehicle operating data from the first on-board vehicle monitoring device;
instructions for receiving a second set of vehicle operating data from a second on-board vehicle monitoring device of a second vehicle;
instructions for compiling statistics on a driver's behavior, based at least in part on the first set of vehicle operating data and the second set of vehicle operating data from the first and second on-board vehicle monitoring device;
instructions for providing a user interface; and
instructions for causing the user interface to display, for a user, information corresponding to the compiled statistics on the driver's behavior.

20. The apparatus of claim 19, wherein the set of instructions further comprises:
instructions for creating a driver report, wherein the driver report contains information compiled from the first set of vehicle operating data and the second set of vehicle operating data, and each set of vehicle operating data pertains to a same driver; and
instructions for displaying the driver report to a user.

21. The apparatus of claim 20, wherein each set of vehicle operating data pertains to a different vehicle.

22. The apparatus of claim 20, wherein the set of instructions further comprises: instructions for comparing at least a portion of the compiled information against a set of benchmark values.

23. The apparatus of claim 19, wherein the set of instructions further comprises: instructions for creating a brake summary report from at least the first set of vehicle operating data and the second set of vehicle operating data, wherein the brake summary report comprises a number of braking events and a number of braking miles; and
instructions for displaying the brake summary report to a user.

24. The apparatus of claim 19, wherein the set of instructions further comprises:
instructions for creating a trip summary report, wherein the trip summary report includes the starting location of a trip, the ending location of the trip, and the duration of the trip; and
instructions for displaying the trip summary report to a user.

25. The apparatus of claim 24, wherein vehicle activity that qualifies as the trip is defined by the user.

26. The apparatus of claim 19, wherein the set of instructions further comprises:
instructions for creating a fuel usage report, wherein the fuel usage report includes information regarding: miles per gallon and ignition cycles; and
instructions for displaying the fuel usage report to a user.

27. The apparatus of claim 19, wherein the first set of vehicle operating data comprises a first subset of data and a second subset of data, the first subset of data comprising information gathered prior to a trigger event, and the second subset comprising information gathered after the trigger event.

* * * * *